United States Patent [19]
Schimmelpfennig et al.

[11] Patent Number: 5,516,479
[45] Date of Patent: May 14, 1996

[54] METHOD OF AND APPARATUS FOR BENDING PLASTIC PIPES

[75] Inventors: Rainer Schimmelpfennig, Baden-Baden; Olaf Lippenoo, Sinzheim, both of Germany

[73] Assignee: Aeroquip Zweigniederlassung der Trinoza GmbH, Baden-Baden, Germany

[21] Appl. No.: 343,581

[22] PCT Filed: Mar. 22, 1994

[86] PCT No.: PCT/EP94/00884

§ 371 Date: Nov. 23, 1994

§ 102(e) Date: Nov. 23, 1994

[87] PCT Pub. No.: WO94/22660

PCT Pub. Date: Oct. 13, 1994

[30] Foreign Application Priority Data

Mar. 26, 1993 [DE] Germany ............................ 43 09 909.2

[51] Int. Cl.⁶ .......................... B29C 53/08; B29C 53/84
[52] U.S. Cl. .......................... 264/322; 72/342.5; 72/369; 264/339; 425/162; 425/384; 425/392
[58] Field of Search ................................. 264/322, 339; 425/162, 384, 392; 72/342.5, 369

[56] References Cited

U.S. PATENT DOCUMENTS

| | | | |
|---|---|---|---|
| 2,571,416 | 10/1951 | Brown | 264/339 X |
| 3,184,796 | 5/1965 | Southcott et al. | 425/384 |
| 3,965,715 | 6/1976 | Parmann | 72/342.1 |

FOREIGN PATENT DOCUMENTS

| | | | |
|---|---|---|---|
| 486237 | 5/1992 | European Pat. Off. | |
| 2345278 | 10/1977 | France | |
| 551855 | 7/1974 | Switzerland | 264/339 |

*Primary Examiner*—Leo B. Tentoni
*Attorney, Agent, or Firm*—Hopkins & Thomas

[57] ABSTRACT

The invention relates to a method for bending plastic pipes in which a plastic pipe section is heated at the bending point. The feature of the invention is that the pipe section (4) is first heated in a water bath at about 80° C. and then laid around one or more bending plates (3), depending on the desired shape, whereupon the bending plates are subjected to a heat source (5), for example a hot air blower, and partially heated, depending on the pipe material used, to a maximum of 160° C. for 10 to 15 seconds, whereafter the pipe section is subjected to a first cooling process from inside of the pipe using cold compressed air for 10 to 15 seconds. The pipe section is then placed in a cold water bath.

12 Claims, 3 Drawing Sheets

5,516,479

METHOD OF AND APPARATUS FOR BENDING PLASTIC PIPES

This invention relates to a method and a device for bending plastic pipes in which a plastic pipe or tube is heated at the bending point.

It is known to heat plastic pipes in a manner by placing the pipes into an oil bath of about 160° C. and then manually bending the pipe around a bending mandrel or a bending roller into the desired shape. This known method is performed manually and in terms of the craftsmanship required is relativly complicated. Generally the method may be performed only by skilled workers. In addition, the exactness of the desired shape of the bent pipe is not reached in each case.

SUMMARY OF THE INVENTION

It is the object of the invention to provide a method which is suitable to exactly and quickly converting the pipe into the desired shape, even when the method is performed by unskilled and unpractised workers.

According to the invention this is achieved by a method of the described art, wherein the pipe section is first heated in a water bath at about 80° C. and then laid around one or more bending plates, depending on the desired shape, whereupon the bending plates are subjected to a heat source, for example a hot air blower, and partially heated, depending on the pipe material used, to a maximum of 160° C. for 10 to 15 seconds, whereafter the pipe section is subjected to a first cooling process from inside the pipe using cold compressed air for 10 to 15 seconds, and where the pipe section is then placed in a cold water bath.

By using this method it is possible to very quickly and exactly convert pipe sections into a shape in one or more planes, whereby the production of these bent pipe sections is rapidly accelerated and reduced in cost.

The invention also includes a device in which a plurality of bending plates having flutes are positioned on a frame, depending on the desired shape, and an air heater, for example a hot air blower, is positioned opposite to each bending plate, displacable toward and away from the bending plate, and containing an air channel surrounding the bending plate, plus switch elements and control elements for controlling the process, especially for moving and switching the air heaters on and off and for introducing the cold compressed air to cool the bent pipe sections. Using the device according to the invention it is possible in a simple manner to lay the pipe sections, which are heated prior to bending in a water bath at 80° C., and have a certain reset resilience, around the specially positioned bending plates and to move the air heaters toward the bending plates at the bending points.

A preferred embodiment of the device for implementing the method of this invention shows that the bending plates, having flutes defined therein according to the diameter of the pipe sections, are provided with at least one row of openings on each of their two surfaces for the cross flow of the hot air of the air heaters over the pipe section.

A further embodiment of the invention provides holes at the base of the flutes of the bending plates, which run into an exhaust conduit for the hot air provided in the bending plate.

A further embodiment of the invention shows that the bending plates contain two parts, in which an upper part has the shape of a semicircle only and is placed pivotably on a lower part, to make it possible to lay the pipe section into the bending plate.

The air heater apparatus may also have a hot air blower and an air channel for the hot air, the air channel having a cutout in a semicircular shape.

BRIEF DESCRIPTION OF THE DRAWINGS

Preferred embodiments of the method and the device according to the invention are illustrated in connection with the drawings, which show in.

DETAILED DESCRIPTION

Figure 1:
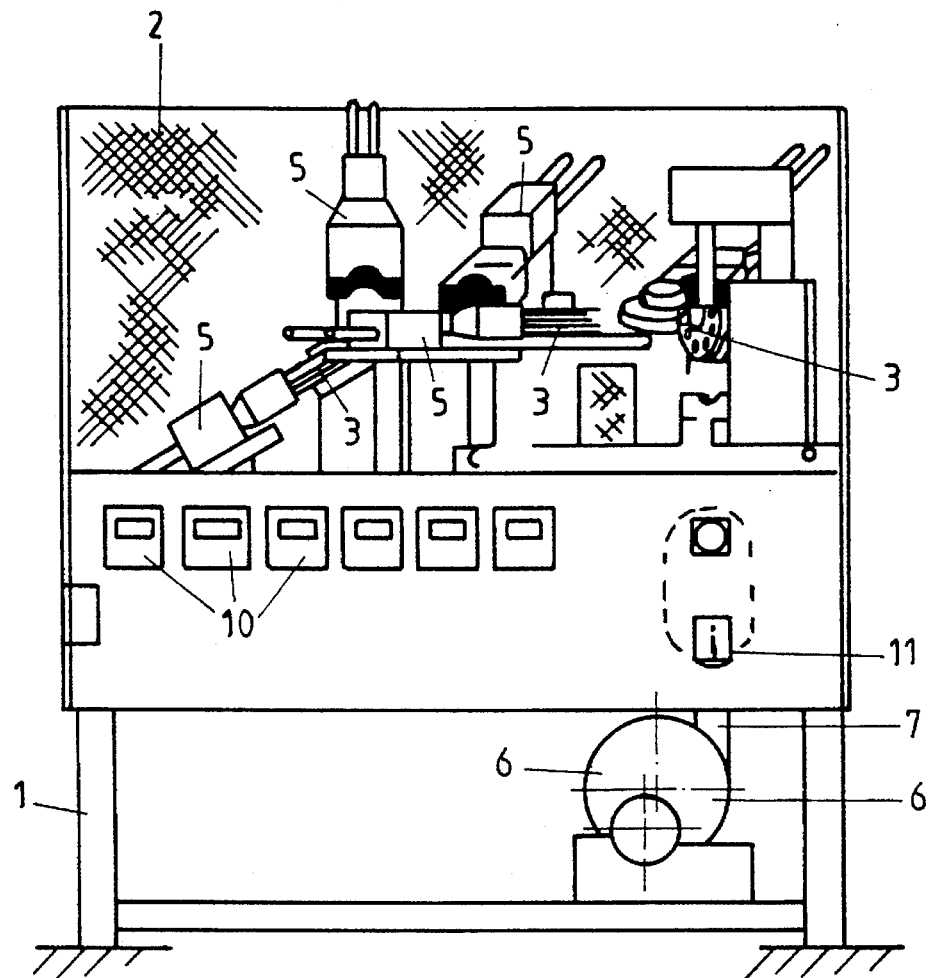
FIG. 1 a schematic view of a pipe bending device.

On a frame 1, protected by a grid 2, a plurality of bending plates 3 are provided, the bending plates being supported by special holders. The pipe section 4 to be bent is taken out off a warming water bath and positioned around the bending plates. Air heaters 5, for example hot air blowers, may be directed toward each of the bending plates to heat up the pipe section at those regions of curvature desired in the pipe section.

Figure 2:
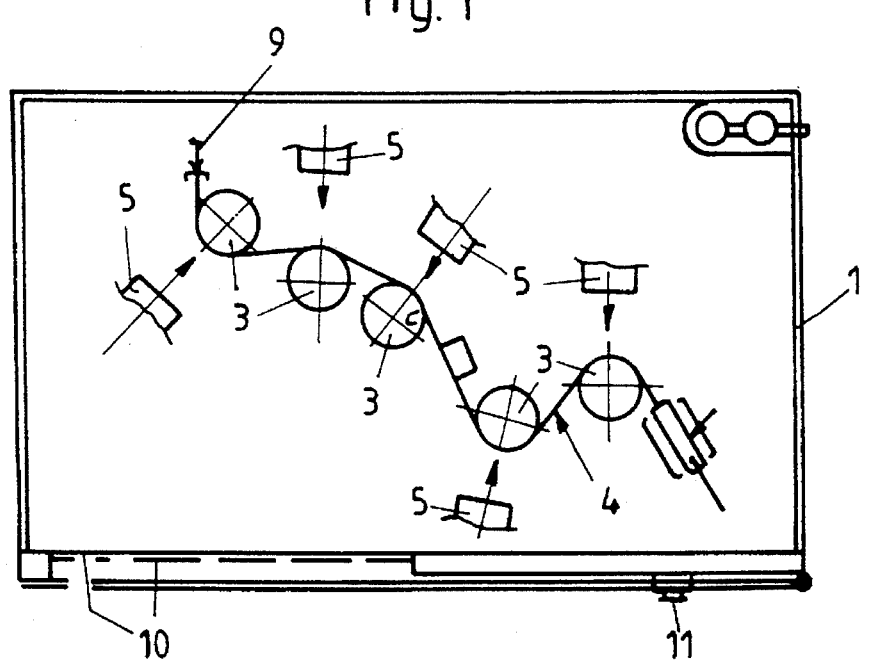
FIG. 2 a top plan view of the device of FIG. 1.

In FIG. 2 the bending plates are shown in one plane. The bending plates are actually positioned in space according to the shape of the pipe section to be bent, as seen in FIG. 1.

A fan 6 is provided for leading air to the air heaters 5 through conduit 7. A support 8 for the pipe section may be provided if needed. A nozzle 9 is provided to cool the pipe section with compressed air.

The device contains a temperature indicator 10, positioned on its front, and a main switch 11 for the fan used to cool down the air heaters. The main switch contains a time delay device.

Figure 3:
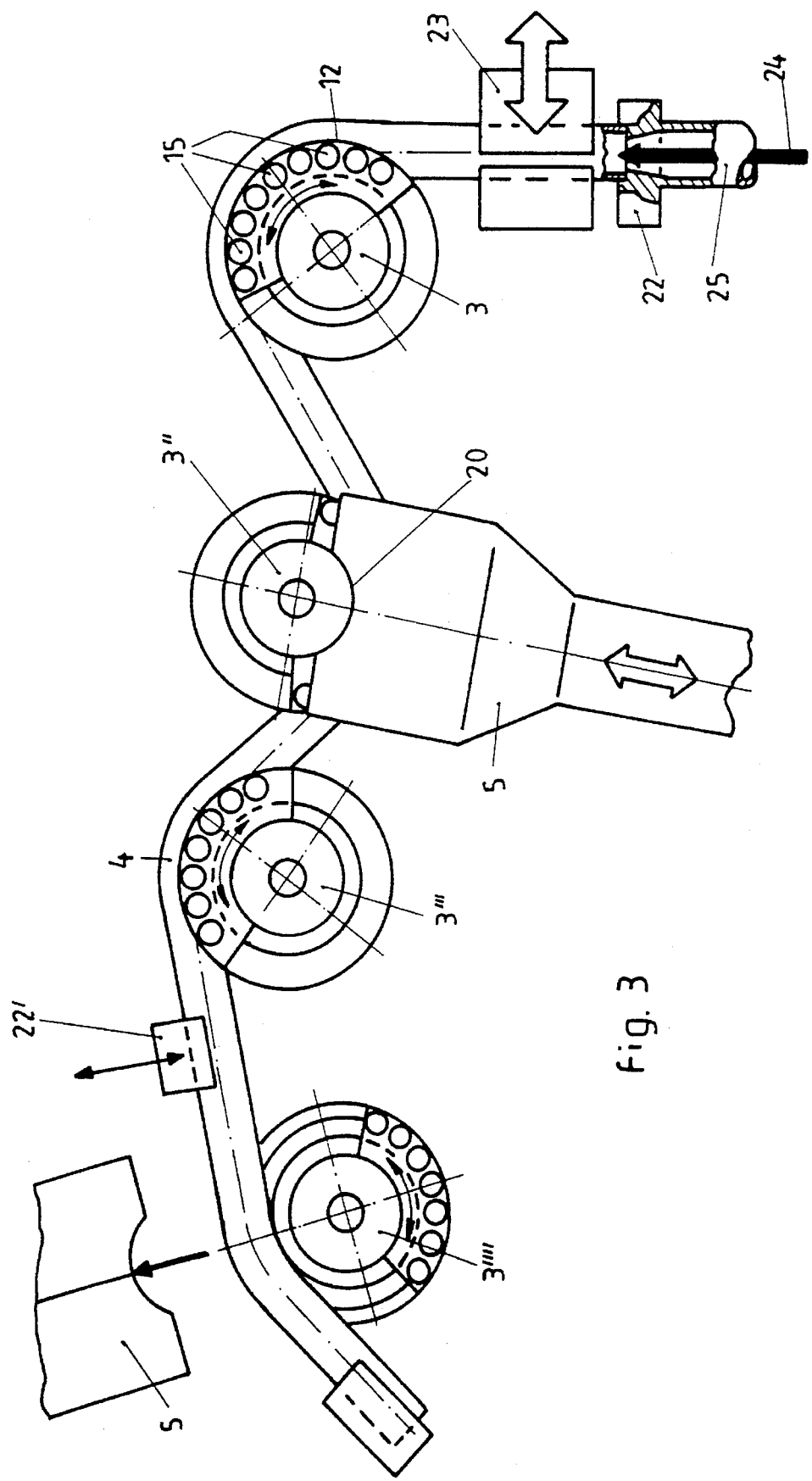
FIG. 3 the part of the device of FIG. 1 containing the bending plates and the air heaters in enlarged scale, FIG. 4 a top view on a bending plate, and FIG. 5 a vertical cross section through the device along the section lines shown in FIG. 4.

FIG. 3 shows a detail of the bending plates in enlarged scale.

Figure 4:
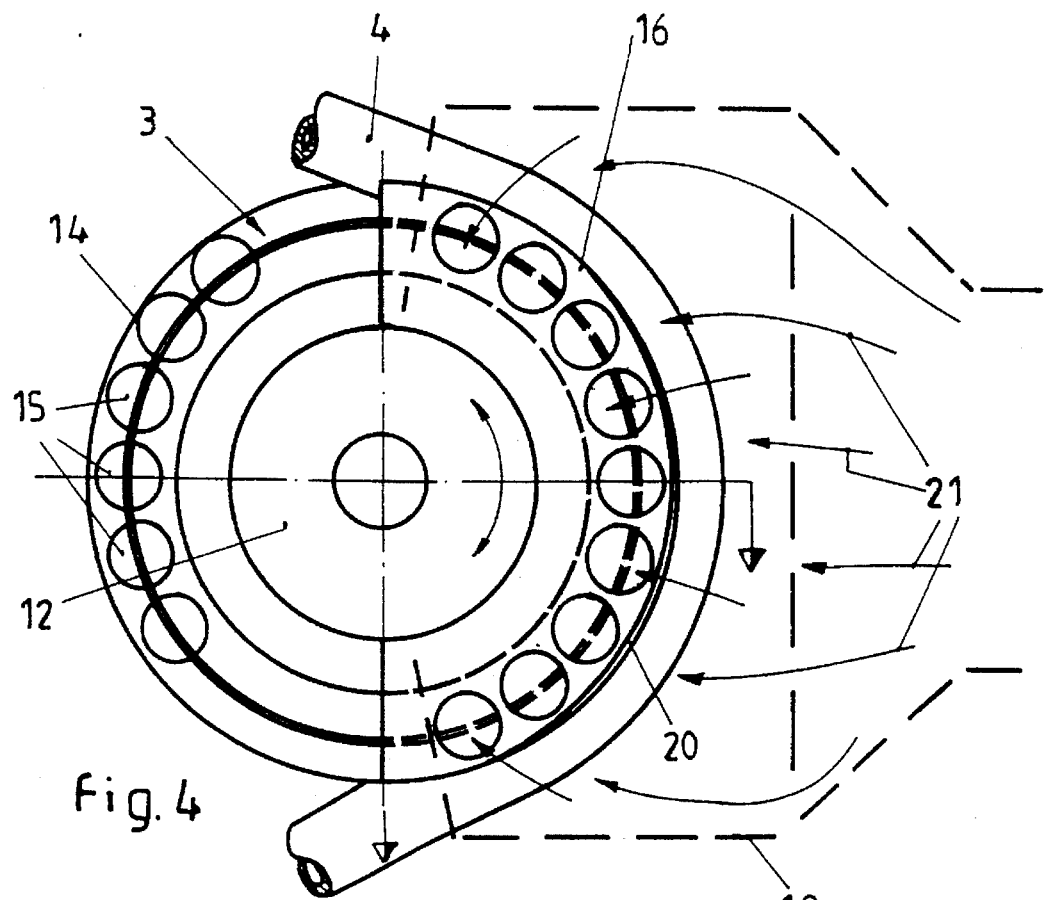
Figure 5:
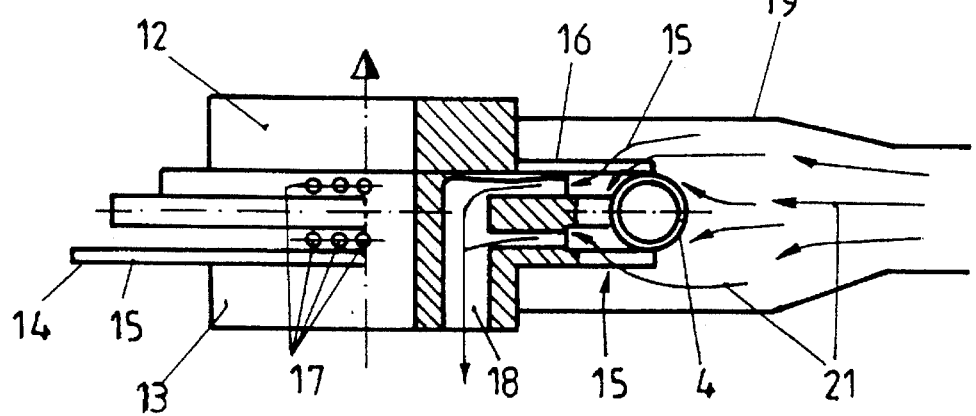

As is seen in FIGS. 4 and 5 in connection with FIG. 3, the bending plates 3 are provided with two parts, un upper part 12 and a lower part 13. The lower part 13 contains a disk plate 14 in the shape of a full circle having openings 15 desired therein. The upper part 12 contains a disk plate 16 in the shape of a semicircle, also having openings 15. The upper part 12 may be pivoted with respect to the lower part 13.

In the center of both parts a plurality of holes 17 are located, which run into exhaust conduits 18. An air channel 19, having a cutout 20 according to the shape of the center of the disk plates, is positioned with respect to a bending plate 3. The air 21 coming from the air heater runs through the openings 15, flows around the pipe section 4 to be bent, and runs through the holes 17 into the exhaust conduits 18. Thus the pipe section 4 is heated up to the desired temperature in an intensive manner.

The bending action of the pipe section is illustrated in FIG. 3. A pipe section 4 of the finished length and having fittings at its ends, and having been preheated in the warming water bath, is positioned in the bending device with respect to a stop 22.

The sequence of the individual bending operations is determined according to the desired curvatures of the pipe section to be produced. First bending plate 3' is closed manually by turning the upper part 12. The pipe section is gripped by a clamping device 23 to fix the pipe section in position. The bending plates 3" and 3'" are closed, and the bending plate 3"" is open. Thereafter the pipe section is manually bent into the next position and placed around the bending plate 3", which is closed again. The bending operation runs in the same manner up to the bending plate 3"". Further clamping devices 23' are locked if necessary.

These operations are continued in the same manner until the last bend of the workpiece has been placed in the device, for example at the bending plate 3"", and this bending plate is closed also.

Now the air heaters 5 are placed in the position at each of bending plates 3" and 3"" to heat the pipe section up to the necessary working temperature in those regions in which the curvatures are desired.

After a heating time of about 10 to 15 seconds, suitable for theworkpiece, the air heaters 5 are retracted automatically into their starting position. Cold compressed air 24 is introduced, flowing through the pipe section 4. This cold air runs out of a nozzle 25 positioned at the stop 22, suitable for the adjustment of the workpiece.

After a preditermined cooling time the cold compressed air is stopped automatically, the clamping devices and the bending plates are opened and the workpiece is taken out of the device and placed into a water bath in a second cooling phase for withdrawl of the rest of the heat out of the workpiece.

While the foregoing specification and the accompanying drawings disclose the preferred embodiments of the invention, it will be understood by those skilled in the art that variations and modifications thereof can be made without departing from the spirit and scope of the invention, as set forth in the following claims.

LIST OF REFERENCE NUMERALS

1 - frame
2 - grid
3 - bending plate
4 - pipe section
5 - air heater
6 - fan
7 - conduit
8 - support
9 - nozzle
10 - temperature indicator
11 - main switch
12 - upper part
13 - lower part
14 - disk plate
15 - opening
16 - disk plate
17 - hole
18 - exhaust conduit
19 - air channel
20 - cutout
21 - air
22 - stop
23 - clamping device
24 - cold air
25 - nozzle

We claim:

1. A method for bending plastic pipes in which a plastic pipe section is heated at the bending point, wherein the pipe section (4) is first heated in a water bath at about 80° C. and then laid around one or more bending plates (3) which are arranged according to the desired shape of the pipe, whereupon the bending plates are subjected to a heat source (5) which heats the portion of the pipe extending around the bending plates to a maximum of 160° C. for 10 to 15 seconds, the temperature applied depending on the pipe material used, whereafter the pipe section is subjected to a first cooling process from inside of the pipe using cold compressed air for 10 to 15 seconds, and the pipe section is then placed in a cold water bath.

2. An apparatus for bending a plastic pipe, wherein a plurality of bending plates (3) each of which has flutes are positioned on a frame (1), the arrangement of said plates depending on the desired shape of the pipe, and opposite to each bending plate (3) an air heater (5) displacable toward and away from each bending plate, and containing an air channel (19) surrounding each bending plate, is positioned, and switch elements and control elements for controlling the process are provided, for moving and switching the air heaters on and off and for introducing cold compressed air inside of the pipe to cool the pipe sections.

3. The apparatus of claim 2, wherein the bending plates (3), having flutes defined therein according to the diameter of the pipe sections, are provided with at least one row of openings (15) on each of their two surfaces for the cross flow of hot air from the air heaters over the pipe section.

4. The apparatus of claim 3, wherein a plurality of holes (17) are provided at the base of the flutes of the bending plates, which holes run into an exhaust conduit (18) for the hot air being provided in the bending plate.

5. The apparatus of claim 2, wherein the bending plates (3) contain two parts, whereby an upper part (12) has the shape of a semicircle only and is placed pivotably on a lower part (13), to make it possible to lay the pipe into the bending plate.

6. The apparatus of claim 2, wherein the air heater includes a hot air blower (5) and an air channel (19) for the hot air, the air channel having a cutout (20) in a semicircular shape.

7. A method for bending a plastic pipe in which a section of the plastic pipe is heated at the desired bending point, comprising the steps of:

heating the pipe section in a water bath at about 80° C.;

laying said pipe section around at least one bending plate;

subjecting said bending plate to a heat source;

heating said pipe section to a maximum temperature of 160° C. for ten to fifteen seconds;

cooling said pipe section by admitting cold compressed air into the inside of said pipe section for ten to fifteen seconds; and further cooling said pipe section in a cold water bath.

8. An apparatus for bending a plastic pipe in which a section of the plastic pipe is heated at the bending point, comprising:

a plurality of bending plates, each of said plurality of bending plates having flutes;

an air heater which is displaceable toward and away from said plurality of bending plates;

an air channel surrounding each of said plurality of bending plates;

switch elements and control elements for controlling the process, for moving and switching said air heater on and off, and for introducing cold compressed air inside the pipe to cool the pipe section.

9. The apparatus of claim 8, wherein said flutes are defined according to the diameter of the pipe section and wherein at least one of said plurality of bending plates is provided with at least one row of openings on each of its two surfaces for the cross flow of hot air from said air heater over the plastic pipe.

10. The apparatus of claim 8, wherein said flutes are provided with a plurality of holes at their base, said holes running into a exhaust conduit.

11. The apparatus of claim 8, wherein at least one of said plurality of bending plates contains two parts, an upper part and a lower part, whereby said upper part has the shape of a semicircle and said upper part is placed pivotably on said lower part to make it possible to lay the pipe section into said bending plate.

12. The apparatus of claim 8, wherein said air heater includes a hot air blower and an air channel for the hot air, the air channel having a cutout in a semi-circular shape.

\* \* \* \* \*